US011276892B2

(12) United States Patent
Yamanaka

(10) Patent No.: US 11,276,892 B2
(45) Date of Patent: Mar. 15, 2022

(54) BATTERY PACK

(71) Applicant: TOYOTA JIDOSHA KABUSHIKI KAISHA, Toyota (JP)

(72) Inventor: Atsushi Yamanaka, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 163 days.

(21) Appl. No.: 16/050,512

(22) Filed: Jul. 31, 2018

(65) Prior Publication Data

US 2019/0051951 A1 Feb. 14, 2019

(30) Foreign Application Priority Data

Aug. 8, 2017 (JP) .............................. JP2017-153095

(51) Int. Cl.
| | |
|---|---|
| *H01M 10/48* | (2006.01) |
| *H01M 50/20* | (2021.01) |
| *H01M 50/35* | (2021.01) |
| *H01M 50/308* | (2021.01) |
| *H01M 10/613* | (2014.01) |
| *H01M 10/625* | (2014.01) |
| *H01M 10/6567* | (2014.01) |

(52) U.S. Cl.
CPC ....... *H01M 10/486* (2013.01); *H01M 10/482* (2013.01); *H01M 10/613* (2015.04); *H01M 10/625* (2015.04); *H01M 10/6567* (2015.04); *H01M 50/20* (2021.01); *H01M 50/308* (2021.01); *H01M 50/35* (2021.01); *H01M 2220/20* (2013.01)

(58) Field of Classification Search
CPC ............. H01M 10/486; H01M 10/613; H01M 10/625; H01M 10/6567; H01M 10/482; H01M 50/308; H01M 50/35; H01M 50/20; H01M 2220/20
See application file for complete search history.

(56) References Cited

U.S. PATENT DOCUMENTS

| | | | |
|---|---|---|---|
| 8,563,151 B2 | 10/2013 | Matsumoto et al. |
| 2010/0009244 A1 | 1/2010 | Murata |
| 2010/0052692 A1 | 3/2010 | Yano et al. |
| 2010/0073005 A1 | 3/2010 | Yano et al. |
| 2011/0059341 A1 | 3/2011 | Matsumoto et al. |

(Continued)

FOREIGN PATENT DOCUMENTS

| | | |
|---|---|---|
| CN | 101662054 A | 3/2010 |
| CN | 102007619 A | 4/2011 |

(Continued)

*Primary Examiner* — Cynthia H Kelly
*Assistant Examiner* — Kirsten B Tysl
(74) *Attorney, Agent, or Firm* — Sughrue Mion, PLLC

(57) ABSTRACT

A battery pack installed in a vehicle, includes battery cells including relief valves and exhausting gas through the relief valves; gas-ventilation-passage defining portions each of which includes an inner surface and an outer surface, and is provided with a gas ventilation passage on the inner surface side to allow the gas exhausted from the relief valves to pass through the gas ventilation passage; and a temperature sensor disposed on the outer surface side of the gas-ventilation-passage defining portion to measure the temperature of the inside of the gas ventilation passage via the gas-ventilation-passage defining portion.

15 Claims, 8 Drawing Sheets

(56) References Cited

U.S. PATENT DOCUMENTS

| | | | |
|---|---|---|---|
| 2012/0276423 A1 | 11/2012 | Asakura et al. | |
| 2012/0315520 A1* | 12/2012 | Minami | H01M 10/6557 |
| | | | 429/82 |
| 2014/0014420 A1 | 1/2014 | Nakamura et al. | |
| 2015/0072193 A1* | 3/2015 | Balk | H05K 1/0218 |
| | | | 429/82 |
| 2016/0315298 A1* | 10/2016 | Lohr | H01M 2/1077 |
| 2017/0012268 A1* | 1/2017 | Watanabe | H01M 50/3425 |

FOREIGN PATENT DOCUMENTS

| | | | | |
|---|---|---|---|---|
| CN | 102056757 A | 5/2011 | | |
| CN | 102668227 A | 9/2012 | | |
| CN | 105940523 A | 9/2016 | | |
| CN | 205985138 U | 2/2017 | | |
| JP | 2008-251308 A | 10/2008 | | |
| JP | 2010-080135 A | 4/2010 | | |
| JP | 4582205 B2 | 11/2010 | | |
| JP | 5618895 B2 | 11/2014 | | |
| JP | 2015138647 A * | 7/2015 | | H01M 50/502 |
| JP | 2015-220003 A | 12/2015 | | |
| JP | 2017004803 A | 1/2017 | | |
| WO | 2009/128214 A1 | 10/2009 | | |
| WO | 2015/110891 A1 | 7/2015 | | |

* cited by examiner

BATTERY PACK

CROSS-REFERENCE TO RELATED APPLICATIONS

This application claims priority to Japanese Patent Application No. 2017-153095 filed on Aug. 8, 2017, which is incorporated herein by reference in its entirety.

BACKGROUND

1. Technical Field

The present disclosure relates to a battery pack.

2. Description of Related Art

As disclosed in Japanese Patent Application Publication No. 2015-220003, Japanese Patent Application Publication No. 2010-080135, and Japanese Patent Application Publication No. 2008-251308, there have been known battery packs including gas ventilation passages. For example, due to occurrence of a short circuit in battery cells, when the inner pressure inside the battery cells becomes greater than a predetermined threshold value, gas is exhausted from relief valves of the battery cells. This gas is exhausted through the gas ventilation passage to the outside of the battery pack.

SUMMARY

The gas exhausted from the relief valves of the battery cells has a temperature of 200° C. to 300° C., or a higher temperature, for example. By providing a temperature sensor in the gas ventilation passage to measure the temperatures in the gas ventilation passage by the temperature sensor, it is possible to detect that the gas is exhausted from the relief valves of the battery cells.

By setting the dimension of the gas ventilation passage (a flow-passage sectional area) smaller, it might be possible to promote size reduction of the entire battery pack, or it might be possible to promote enhancement of performance of the battery pack by utilizing a space spared by a reduced dimension of the gas ventilation passage for other components. Unfortunately, if the dimension of the gas ventilation passage is reduced, it becomes difficult to dispose the temperature sensor in the gas ventilation passage.

The present disclosure provides a battery pack having a configuration capable of measuring a temperature in a gas ventilation passage without disposing a temperature sensor in the gas ventilation passage.

According to one aspect of the present disclosure, a battery pack installed in a vehicle is provided, the battery pack including: a plurality of battery cells, each of the battery cells including a relief valve and being configured to exhaust gas through the relief valve; gas-ventilation-passage defining portions, each of the gas-ventilation-passage defining portions including an inner surface and an outer surface and provided with a gas ventilation passage defined by the inner surface of the gas-ventilation-passage defining portion, and configured to allow the gas exhausted from the relief valves to pass through the gas ventilation passage; and a temperature sensor disposed on a side of the outer surface of the gas-ventilation-passage defining portion, and configured to measure a temperature of an inside of the gas ventilation passage via the gas-ventilation-passage defining portion.

According to the configuration of the above battery pack, when the gas passes through the gas ventilation passage, heat of the gas increases the temperature of the gas-ventilation-passage defining portions; thus, even the temperature sensor disposed on the side of the outer surface of the gas-ventilation-passage defining portion can indirectly measure the temperature of the inside of the gas ventilation passage via the gas-ventilation-passage defining portion, and thus it is possible to detect that the gas is exhausted from the relief valves of the battery cells.

In the above battery pack, the temperature sensor may be disposed to be in contact with the outer surface of the gas-ventilation-passage defining portion.

According to the configuration of the above battery pack, the temperature sensor can measure the temperature of the inside of the gas ventilation passage with a high responsiveness.

The above battery pack may further include a heat transfer member in contact with the outer surface of the gas-ventilation-passage defining portion, and the temperature sensor may be disposed to be in contact with the heat transfer member, and be configured to measure the temperature of the inside of the gas ventilation passage via the heat transfer member and the gas-ventilation-passage defining portion.

According to the configuration of the above battery pack, a feature that the temperature sensor can be disposed at a position apart from the gas-ventilation-passage defining portion promotes flexibility of installation of the temperature sensor.

The above battery pack may further include a plurality of fixing members fixed to the battery cells, and the gas-ventilation-passage defining portions may be integrally provided in the fixing members.

According to the configuration of the above battery pack, it becomes unnecessary to separately provide a gas-ventilation-passage defining portion, and by fixing the fixing members to the battery cells, it is possible to dispose the gas-ventilation-passage defining portions close to the relief valves.

In the above battery pack, each of the fixing members may be fixed to a corresponding one of the battery cells, and the battery cells along with the fixing members may be stacked such that a plurality of the gas-ventilation-passage defining portions are connected to each other to provide a continuous gas ventilation passage through which the gas is exhausted.

According to the configuration of the above battery pack, by stacking the plurality of the battery cells along with the fixing members, it is possible to dispose the gas-ventilation-passage defining portions close to the relief valves; thus it becomes unnecessary to separately provide a gas-ventilation-passage defining portion, which results in contribution to convenience to an assembling work.

In the above battery pack, a plurality of the relief valves may include a most downstream relief valve located most downstream in a direction in which the gas flows through the inside of the continuous gas ventilation passage, the plurality of the gas-ventilation-passage defining portions may include a downstream part provided with the gas ventilation passage through which the gas exhausted from the most downstream relief valve passes, and the temperature sensor may be configured to measure the temperature of the inside of the gas ventilation passage via the downstream part.

According to the configuration of the above battery pack, no matter from which relief valve of the battery cells the gas is exhausted, the gas passes through the gas ventilation passage provided on the inner side of the inner surface of the downstream part; therefore, the temperature sensor can measure the temperature of the inside of the gas ventilation passage via the downstream part, and no matter from which relief valve of the battery cells the gas is exhausted, by simply measuring the temperature of the inside of the gas ventilation passage by the temperature sensor, it is possible to detect that the gas is exhausted.

The above battery pack may further include a cooling-passage defining member provided on a side of the outer surface of the gas-ventilation-passage defining portions, a cooling passage may be provided between the respective outer surfaces of the plurality of the gas-ventilation-passage defining portions and the cooling-passage defining member, a fluid flowing through the cooling passage may be supplied to cool the plurality of the battery cells, and the temperature sensor may be configured to measure a temperature of the fluid in the cooling passage.

According to the configuration of the above battery pack, with a single temperature sensor, it is possible to measure the temperature of the inside of the gas ventilation passage, and it is also possible to measure the temperature of the cooling fluid.

In the above battery pack, the plurality of the battery cells may include a most upstream battery located most upstream in a direction in which the fluid flows through the inside of the cooling passage, and the temperature sensor may be disposed at a position in the cooling passage and upstream of the most upstream battery cell in the direction in which the fluid flows through the inside of the cooling passage.

According to the configuration of the above battery pack, the temperature sensor can measure the temperature of the cooling fluid that has not yet been used for cooling any of the battery cells, with high accuracy.

In the above battery pack, the cooling passage may be configured to have a flow-passage sectional area that gradually decreases from an upstream side toward a downstream side in the direction in which the fluid flows through an inside of the cooling passage.

According to the configuration of the above battery pack, since pressure gradient is unlikely to be generated in the cooling passage, it is possible to suppress variation in cooling efficiency of the cooling fluid among the plurality of the battery cells.

In the above battery pack, the temperature sensor may be disposed to be adjacent to a surface of the battery cell, and be configured to measure the temperature of the battery cell.

According to the configuration of the above battery pack, using the single temperature sensor, it is possible to measure the temperature of the inside of the gas ventilation passage, and it is also possible to measure the temperature of the battery cell.

According to yet another aspect of the present disclosure, a battery pack installed in a vehicle is provided, the battery pack including: a plurality of battery cells, each of the battery cells including a relief valve and being configured to exhaust gas through the relief valve; gas-ventilation-passage defining portions, each of the gas-ventilation-passage defining portions including an inner surface and an outer surface and provided with a gas ventilation passage defined by the inner surface of the gas-ventilation-passage defining portion, and configured to allow the gas exhausted from the relief valves to pass through the gas ventilation passage; and a temperature sensor disposed on a side of the outer surface of a pipe through which the gas flowing out from the gas-ventilation-passage defining portions passes, and configured to measure a temperature of an inside of the gas ventilation passage.

According to the configuration of the above battery pack, heat of the gas after passing through the inside of the gas ventilation passage increases the temperature of the pipe; therefore, even the temperature sensor disposed on a side of the outer surface of the pipe can indirectly measure the temperature of the inside of the gas ventilation passage via the gas-ventilation-passage defining portion and the pipe, and thus it is possible to detect that the gas is exhausted from the relief valves of the battery cells.

According to the above battery pack including the above-described configuration of the battery pack, it is possible to measure the temperature of the inside of the gas ventilation passage without providing the temperature sensor in the gas ventilation passage.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
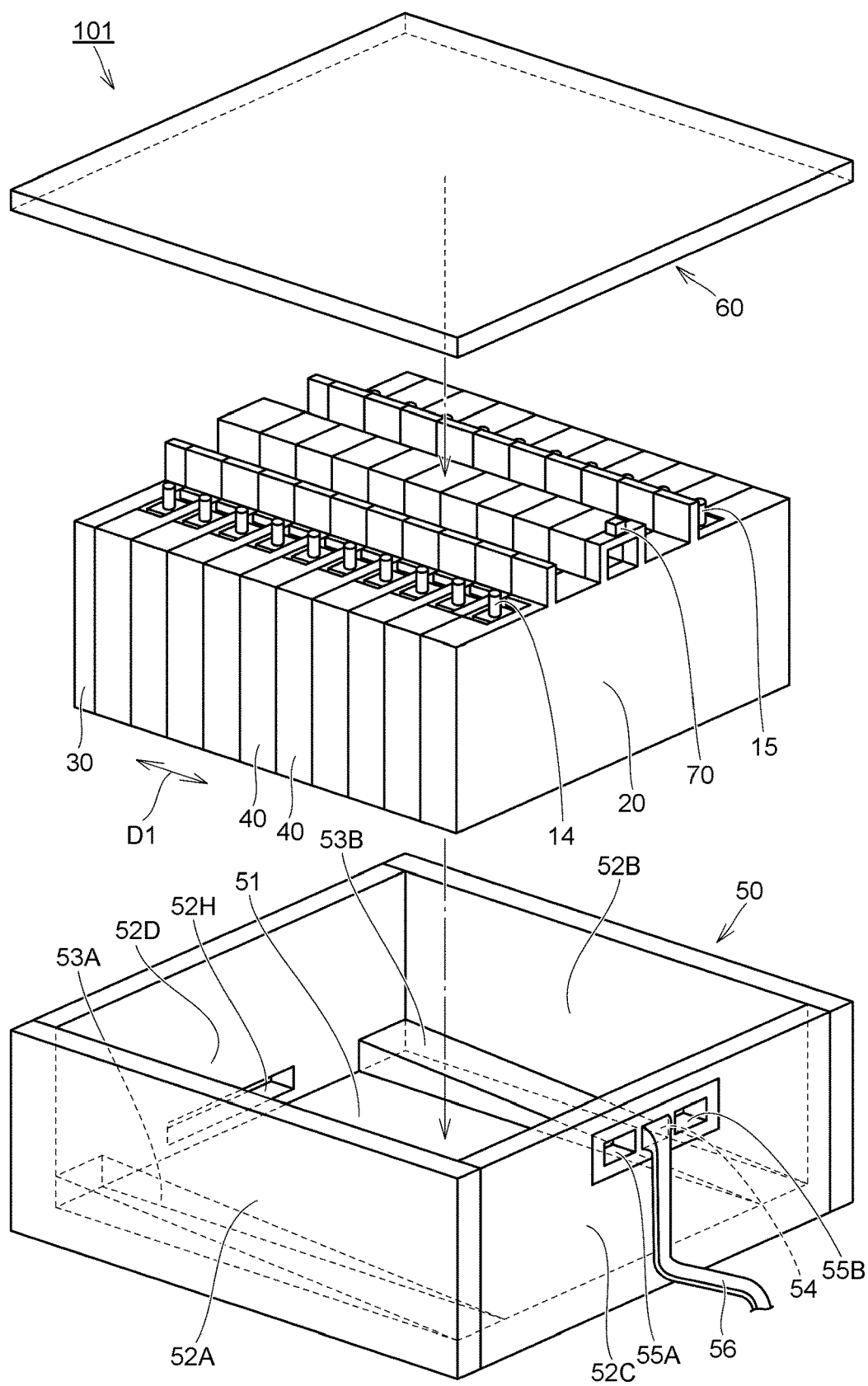
FIG. 1 is a perspective view showing an exploded state of a battery pack 101 according to a first embodiment of the present disclosure.

Embodiments of the present disclosure will be described with reference to the drawings, hereinafter. The same reference numerals are added to the same components and corresponding components, and duplicated descriptions thereof will be omitted.

Figure 2:
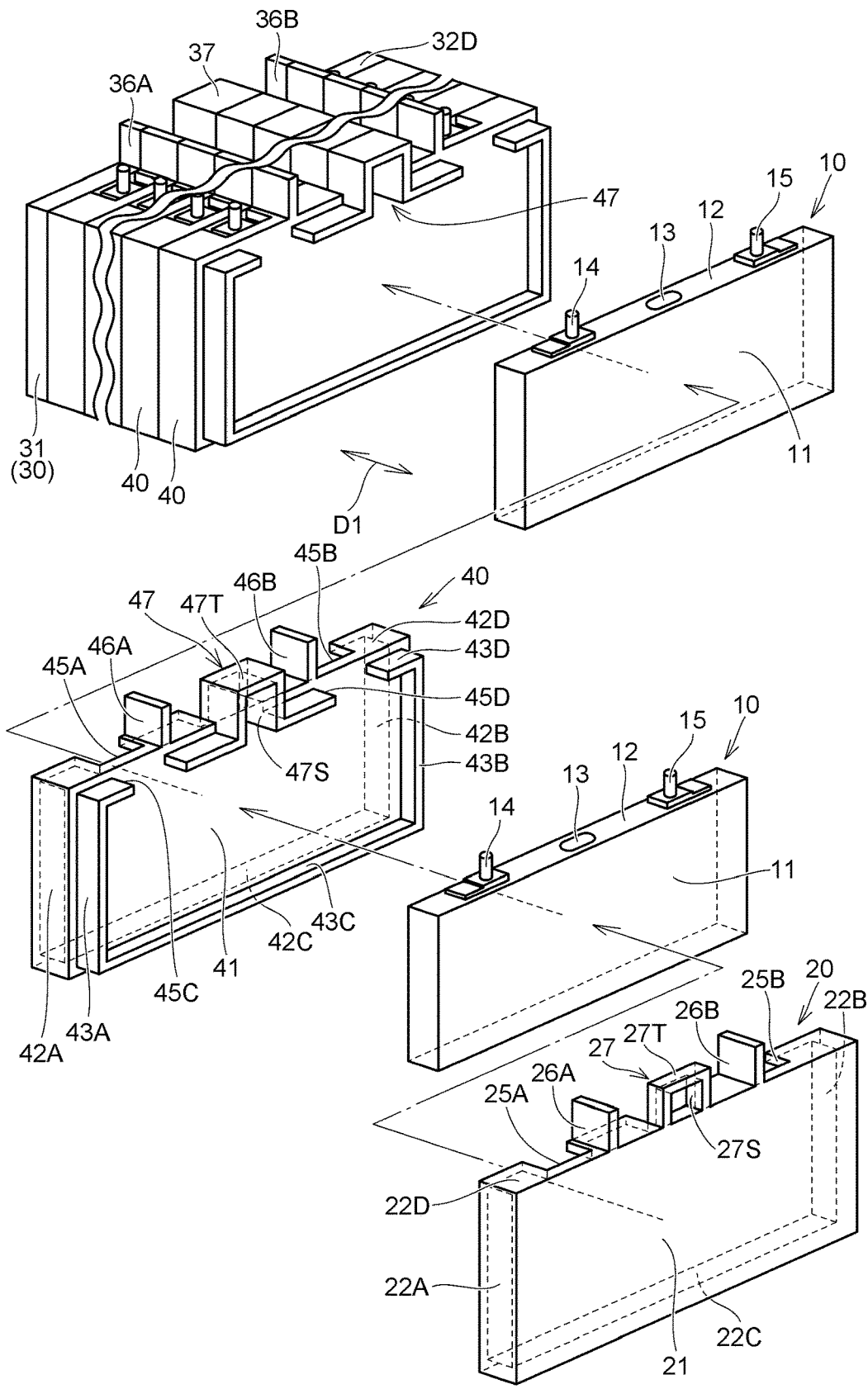
FIG. 2 is a perspective view showing battery cells 10 and fixing members 20, 30, 40 included in the battery pack 101 according to the first embodiment.
Figure 3:
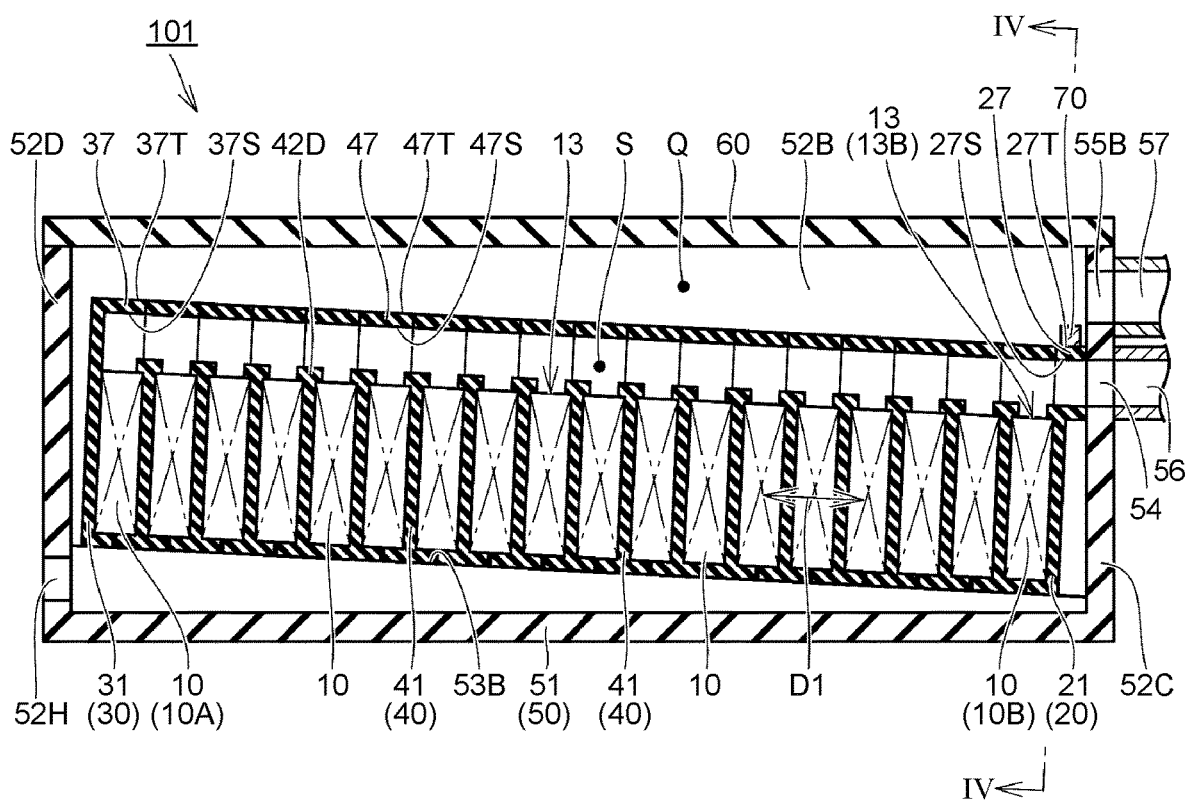
FIG. 3 is a sectional view showing a sectional shape along a stacking direction of the battery pack 101 according to the first embodiment.
Figure 4:
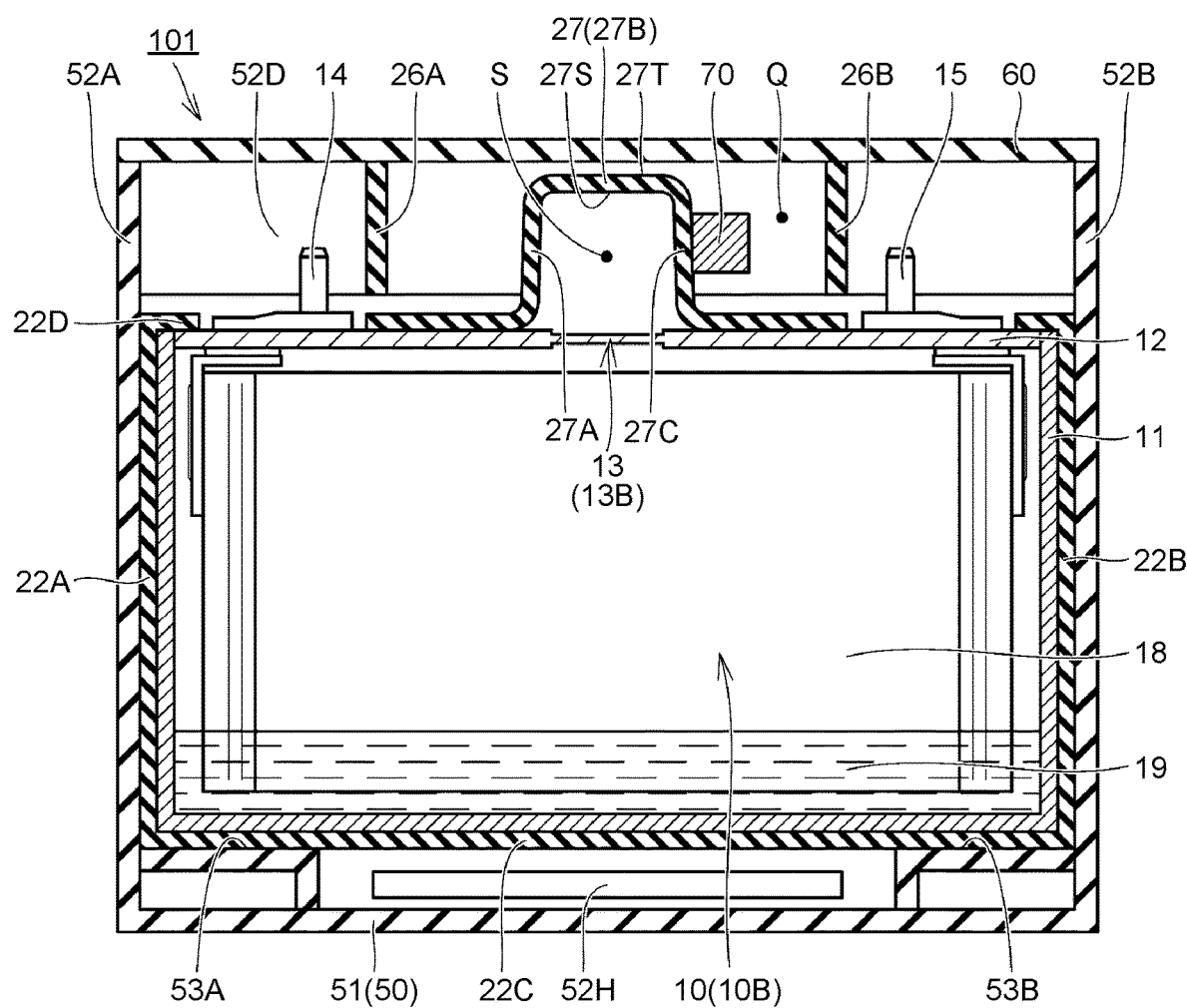
FIG. 4 is a sectional view taken along an arrow line IV-IV in FIG. 3.

First, the first embodiment of the present disclosure will be described. With reference to FIG. 1 to FIG. 4, a configuration of a battery pack 101 according to the first embodiment will be described. FIG. 1 is a perspective view showing an exploded state of the battery pack 101. FIG. 2 is a perspective view showing battery cells 10 and fixing members 20, 30, 40 included in the battery pack 101. FIG. 3 is a sectional view showing a sectional shape along the stacking direction of the battery pack 101. FIG. 4 is a sectional view taken along an arrow line IV-IV in FIG. 3.

The battery pack 101 (FIG. 1, FIG. 3, FIG. 4) is installed in the vehicle. As an example of the vehicle, a hybrid vehicle, a plug-in hybrid vehicle, an electric vehicle (electric automobile), and a fuel cell vehicle may be listed. The battery pack 101 includes a plurality of the battery cells 10 (FIG. 2 to FIG. 4), the fixing members 20, 30, 40 (FIG. 1 to FIG. 3), a casing 50 (FIG. 1, FIG. 3, FIG. 4), a cover 60 (FIG. 1, FIG. 3, FIG. 4), and a temperature sensor 70 (FIG. 1, FIG. 3, FIG. 4).

Next, the casing 50 and the cover 60 will be described. Mainly with reference to FIG. 1, the casing 50 includes a bottom 51, side walls 52A, 52B, and end walls 52C, 52D. The side walls 52A, 52B and the end walls 52C, 52D erect from a peripheral edge (four sides) of the bottom 51. The side walls 52A, 52B have a positional relation such that the side walls 52A, 52B mutually face each other, and the end walls 52C, 52D have a positional relation such that the end walls 52C, 52D mutually face each other. The casing 50 exhibits a bottomed rectangular cylindrical shape as a whole. The cover 60 is fixed to the casing 50 in such a manner as to cover an opening of the casing 50.

An inclined surface 53A is provided on a part closer to the side wall 52A of the bottom 51 in such a manner as to project from the bottom 51. An inclined surface 53B is provided on a part closer to the side wall 52B of the bottom 51 in such a manner as to project from the bottom 51. Both the inclined surfaces 53A, 53B extend from the end wall 52C to the end wall 52D, and respective parts thereof on the end wall 52C side have lower heights, and respective parts thereof on the end wall 52D side have higher heights.

The plurality of the battery cells 10 and the fixing members 20, 30, 40 are integrally placed on the inclined surfaces 53A, 53B (see FIG. 3). In a state in which the plurality of the battery cells 10 and the fixing members 20, 30, 40 are arranged inside the casing 50, the end wall 52C is located at one end in the stacking direction of the plurality of the battery cells 10, and the end wall 52D is located at the other end in the stacking direction of the plurality of the battery cells 10.

Figure 5:
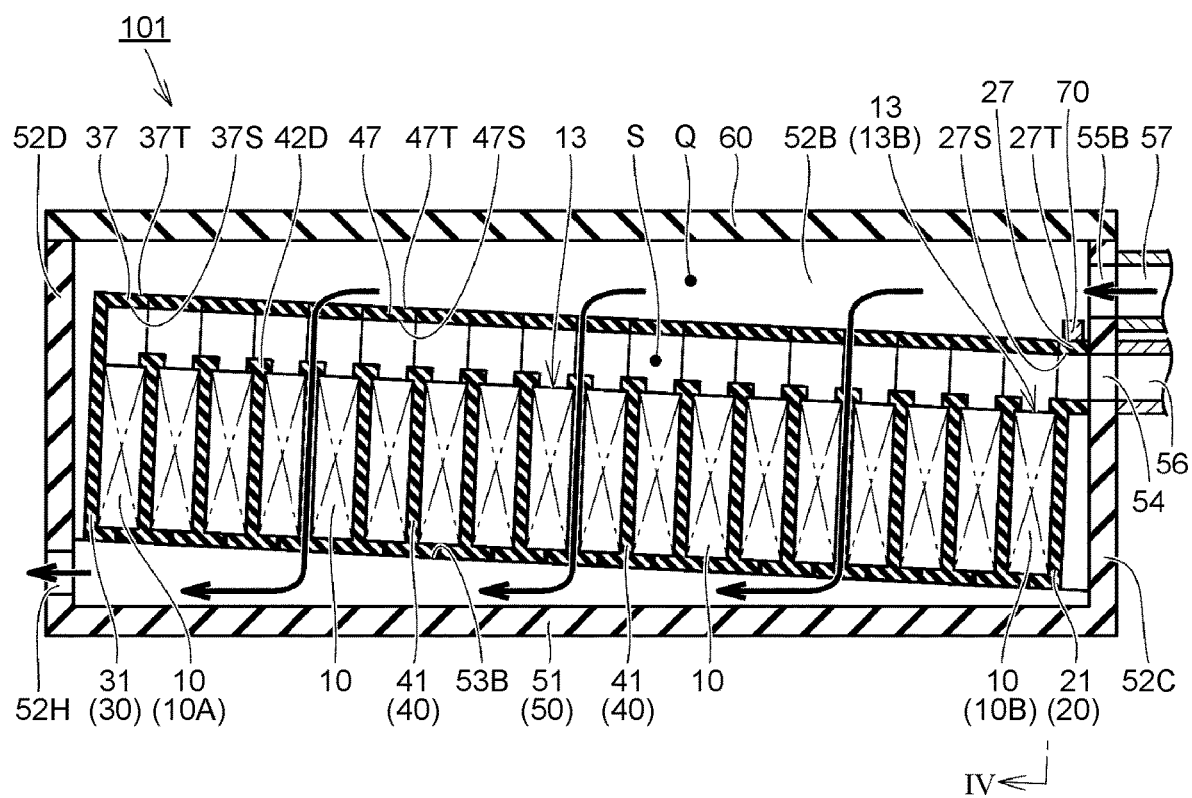
FIG. 5 is a sectional view showing a state in which a cooling fluid flows in a casing 50 in the battery pack 101 according to the first embodiment.

Through-holes 54, 55A, 55B are formed in an upper part of the end wall 52C (FIG. 1). A piping member 57 (FIG. 3) is connected to each of the through-holes 55A, 55B (FIG. 1). As described in detail later, a cooling fluid (such as air) is supplied through the piping member 57 and the respective through-holes 55A, 55B to the plurality of the battery cells 10 (FIG. 5). An exhaust port 52H (FIG. 1, FIG. 3, FIG. 4) is formed in a lower part of the end wall 52D of the casing 50, and the fluid is exhausted through the exhaust port 52H to the outside of the casing 50 (FIG. 5).

Figure 6:
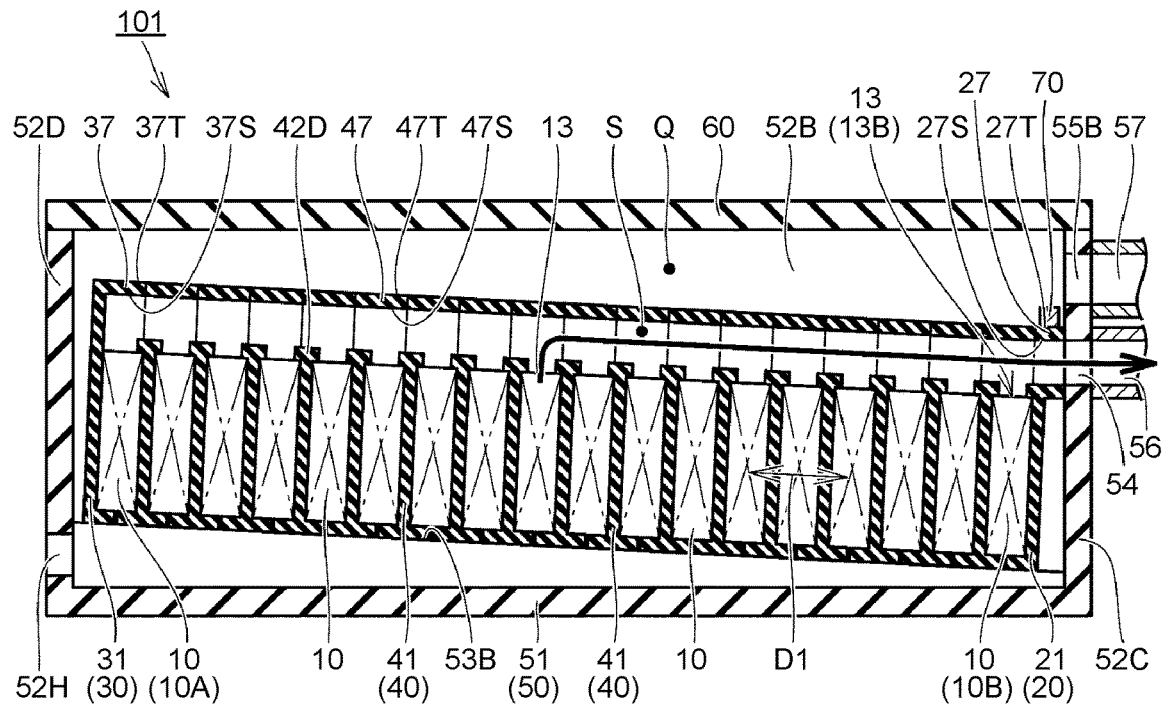
FIG. 6 is a sectional view showing a state in which gas exhausted from a relief valve 13 flows in a gas ventilation passage S in the battery pack 101 according to the first embodiment.

A piping member 56 (FIG. 1, FIG. 3) is connected to the through-hole 54 (FIG. 1). As described in detail later, gas exhausted from relief valves 13 of the battery cells 10 passes through a gas ventilation passage S (FIG. 3, FIG. 4), the through-hole 54, and the piping member 56, and is then exhausted to the outside (FIG. 6).

FIG. 1 illustrates a configuration that the three through-holes 54, 55A, 55B are arranged in the lateral direction (a direction parallel to the bottom 51). The arrangement is not limited to the configuration that the three through-holes 54, 55A, 55B are aligned in the lateral direction, and for example, there may be employed such a configuration that the two through-holes 55A, 55B are aligned in the lateral direction above the through-hole 54 (see FIG. 3). Parts for introducing the cooling fluid into the battery pack 101 are not limited to the two through-holes 55A, 55B, but a single through-hole may be provided in the end wall 52C instead.

Next, the battery cells 10 will be described. As shown in FIG. 2 to FIG. 4, the plurality of the battery cells 10 are alternately arranged with a plurality of the fixing members 40 in a stacked manner (an arrow D1 indicates the stacking direction). The fixing member 20 is disposed at one end in the stacking direction, the fixing member 30 is disposed at the other end in the stacking direction, and the plurality of the battery cells 10 are integrated with the fixing members 20, 30 and the plurality of the fixing members 40.

Each of the plurality of the battery cells 10 includes a case 11 and a cover 12, and accommodates an electrode body 18 (FIG. 4) and an electrolytic solution 19 (FIG. 4) thereinside. The case 11 is formed by aluminum or an aluminum alloy, and the cover 12 is fixed to the case 11 so as to cover an opening of the case 11. The cover 12 is provided such that a positive electrode terminal 14 and a negative electrode terminal 15 project from a top surface of the cover 12.

The electrode body 18 includes a positive electrode sheet, a separator, and a negative electrode sheet. The positive electrode sheet includes: a metallic foil such as aluminum; and a positive electrode mixture layer applied onto front and back surfaces of the metallic foil, and one side of the metallic foil composes a non-applied portion where no positive electrode mixture layer is applied. The negative electrode sheet includes: a metallic foil such as copper; and a negative electrode mixture layer applied onto front and back surfaces of the metallic foil, and one side of the metallic foil composes a non-applied portion where no negative electrode mixture layer is applied.

The positive electrode sheet, the separator, the negative electrode sheet, and the separator are stacked in turn so as to form the electrode body 18. The electrode body 18 is not limited to the electrode body 18 of a stacking type, but a resultant stacked body may be wound, and thereafter, be deformed into a flat shape so as to form the electrode body 18 of a wound type. One end of the electrode body 18 composes a positive electrode electrically connected to a positive electrode terminal 14, and the other end of the electrode body 18 composes a negative electrode electrically connected to a negative electrode terminal 15.

The cover 12 is also provided with the relief valve 13. The relief valve 13 is formed by cutting the cover 12, for example. For example, when an inner pressure of the battery cell 10 becomes more than a predetermined threshold value due to occurrence of a short-circuit inside the battery cell 10, the relief valve 13 opens to exhaust gas inside the case 11 through the relief valve 13, to thereby suppress the inner pressure in the case 11 from being excessively great.

Subsequently, the fixing members 20, 30, 40 will be described. With reference to FIG. 2, each of the fixing members 20, 30, 40 is formed by a member having electric insulation (e.g. resin). As described above, the plurality of the battery cells 10 are alternately stacked with the plurality of the fixing members 40. The fixing member 20 is disposed at one end in the stacking direction, the fixing member 30 is disposed at the other end in the stacking direction, and the plurality of the battery cells 10 are integrated with the fixing members 20, 30 and the plurality of the fixing members 40.

The fixing member 20 includes a standing wall portion 21, side plate portions 22A, 22B, a lower plate portion 22C, an upper plate portion 22D, cutout portions 25A, 25B, erect walls 26A, 26B, and a gas-ventilation-passage defining portion 27. The standing wall portion 21 has a flat plate-like shape. The standing wall portion 21 is provided with a not-illustrated ventilation passage, and thus a cooling fluid (such as air), supplied through the piping member 57 and the through-holes 55A, 55B to a part above the standing wall portion 21 can pass through the standing wall portion 21 to reach a part below the standing wall portion 21 (see FIG. 5). When the fluid passes through the ventilation passage of the standing wall portion 21, each battery cell 10 (the battery cell 10B illustrated in FIG. 3 and FIG. 5) is cooled by the fluid. Thereafter, the fluid is exhausted through the exhaust port 52H to the outside of the casing 50 (see FIG. 5).

The side plate portions 22A, 22B, the lower plate portion 22C, and the upper plate portion 22D erect from the peripheral edge (four sides) of the standing wall portion 21 in the above-described stacking direction. The side plate portions 22A, 22B, the lower plate portion 22C, and the upper plate portion 22D form a rectangular frame shape as a whole, and a single battery cell 10 (the battery cell 10B illustrated in FIG. 3) is disposed therein.

The cutout portions 25A, 25B are provided in an edge of the upper plate portion 22D. Positions of the cutout portions 25A, 25B correspond to respective positions of the positive electrode terminal 14 and the negative electrode terminal 15 of the battery cell 10 (10B) disposed inside the fixing member 20 (see FIG. 1). In a state in which each battery cell 10 (10B) is disposed and fixed between the standing wall portion 21 of the fixing member 20 and a standing wall portion 41 of each fixing member 40 adjacent to the standing wall portion 21, the positive electrode terminal 14 and the negative electrode terminal 15 of each battery cell 10 (10B) are exposed from the respective cutout portions 25A, 25B (see FIG. 1).

The erect walls 26A, 26B (FIG. 2) are disposed on the upper plate portion 22D (see FIG. 4). The erect wall 26A is adjacent to the cutout portion 25A on the inner side (a side where the gas-ventilation-passage defining portion 27 is located) of the cutout portion 25A, and the erect wall 26B is adjacent to the cutout portion 25B on the inner side (a side where the gas-ventilation-passage defining portion 27 is located) of the cutout portion 25B. The erect walls 26A, 26B function as insulation walls to secure electric insulation between the positive electrode terminal 14 and the negative electrode terminal 15, for example. The erect walls 26A, 26B may support the cover 60 from the lower side of the cover 60.

The gas-ventilation-passage defining portion 27 is provided on the upper plate portion 22D and at a position between the erect walls 26A, 26B. The gas-ventilation-passage defining portion 27 has an inner surface 27S and an outer surface 27T, and exhibits a frame shape as a whole. The gas-ventilation-passage defining portion 27 of the first embodiment includes a pair of side wall portions 27A, 27C and a top plate portion 27B connecting the upper parts of the side wall portions to each other.

The inner surface 27S of the gas-ventilation-passage defining portion 27 is located more downstream than the relief valve 13 (a relief valve 13B illustrated in FIG. 3) provided in the battery cell 10 (the battery cell 10B illustrated in FIG. 3) located most downstream in the flowing direction of the gas, among the plurality of the battery cells 10. The gas ventilation passage (the gas ventilation passage S illustrated in FIG. 3 and FIG. 4) is provided in the inner surface 27S side of the gas-ventilation-passage defining portion 27 such that the gas exhausted from the relief valve 13 of the battery cell 10 passes through the gas ventilation passage S provided in the inner side of the inner surface 27S. In the first embodiment, no matter from which relief valve 13 of the battery cells 10 the gas is exhausted, the gas passes through the gas ventilation passage S provided in the inner side of the inner surface 27S.

Next, the fixing member 30 will be described. With reference to FIG. 2 and FIG. 3, the fixing member 30 has substantially the same configuration as that of the fixing member 20 as a whole. The fixing member 30 includes a standing wall portion 31, a not-illustrated pair of side plate portions, a not-illustrated lower plate portion, an upper plate portion 32D (FIG. 2), erect walls 36A, 36B (FIG. 2), and a gas-ventilation-passage defining portion 37. The standing wall portion 31 has a flat plate-like shape.

The standing wall portion 31 is provided with a not-illustrated ventilation passage, and thus the cooling fluid (such as air), supplied through the piping member 57 and the through-holes 55A, 55B to a part above the standing wall portion 31, can pass through the standing wall portion 31 to reach a part below the standing wall portion 31 (see FIG. 5). When the fluid passes through the ventilation passage of the standing wall portion 31, each battery cell 10 (each of the battery cells 10A, 10B illustrated in FIG. 3) is cooled by the fluid. Thereafter, the fluid is exhausted through the exhaust port 52H to the outside of the casing 50 (FIG. 5).

The pair of the side plate portions, the lower plate portion, and the upper plate portion 32D erect from the peripheral edge (four sides) of the standing wall portion 31 in the above-described stacking direction. The pair of the side plate portions, the lower plate portion, and the upper plate portion 32D forms a rectangular frame shape as a whole, and a single battery cell 10 (the battery cell 10A illustrated in FIG. 3) is disposed therein.

In a state in which the battery cell 10 (10A) is disposed and fixed between the standing wall portion 31 of the fixing member 30 and the standing wall portion 41 of the fixing member 40 adjacent to the standing wall portion 31, the positive electrode terminal 14 and the negative electrode terminal 15 of the battery cell 10 (10A) are exposed respectively from cutout portions 45A, 45B (FIG. 2) of the fixing member 40 (see FIG. 1). The erect walls 36A, 36B (FIG. 2) are disposed on the upper plate portion 32D. The erect walls 36A, 36B function as insulation walls to secure electric insulation between the positive electrode terminal 14 and the negative electrode terminal 15, for example. The erect walls 36A, 36B may support the cover 60 from the lower side of the cover 60.

A gas-ventilation-passage defining portion 37 is disposed on the upper plate portion 32D and at a position between the erect walls 36A, 36B. The gas-ventilation-passage defining portion 37 includes an inner surface 37S (FIG. 3) and an outer surface 37T (FIG. 3). The inner surface 37S of the gas-ventilation-passage defining portion 37 has a portion exhibiting a generally up-side-down U-shape. The portion faces the relief valve 13 provided in the battery cell 10 (the battery cell 10A illustrated in FIG. 3) located at the most upstream position in the gas flowing direction among the plurality of the battery cells 10. A gas ventilation passage (the gas ventilation passage S illustrated in FIG. 3, FIG. 4) is provided in the inner surface 37S side of the gas-ventilation-passage defining portion 37, and the gas exhausted from the relief valve 13 of the battery cell 10 (10A) passes through the inside of the gas ventilation passage S provided in the inner side of the inner surface 37S.

Next, the fixing member 40 will be described. With mainly reference to FIG. 2, the fixing member 40 includes the standing wall portion 41, side plate portions 42A, 42B, 43A, 43B, lower plate portions 42C, 43C, upper plate portions 42D, 43D, cutout portions 45A, 45B, 45C, 45D, erect walls 46A, 46B, and a gas-ventilation-passage defining portion 47. The standing wall portion 41 has a flat plate-like shape.

The standing wall portion 41 is provided with a not-illustrated ventilation passage, and thus the cooling fluid (such as air), supplied to the upper part of the standing wall portion 41 through the piping member 57 and the through-holes 55A, 55B, can pass through the standing wall portion 41 to reach a part below the standing wall portion 41 (see FIG. 5). When the fluid passes through the ventilation passage of the standing wall portion 41, the battery cell 10 is cooled by the fluid. The fluid is exhausted through the exhaust port 52H to the outside of the casing 50 (FIG. 5).

The side plate portions 42A, 42B, the lower plate portion 42C, and the upper plate portion 42D erect from a peripheral edge (four sides) of the standing wall portion 41 toward one side of the above-described stacking direction (the side on which the fixing member 30 is disposed). The side plate portions 42A, 42B, the lower plate portion 42C, and the upper plate portion 42D form a rectangular frame shape as a whole, and a single battery cell 10 is disposed thereinside.

The side plate portions 43A, 43B, the lower plate portion 43C, and the upper plate portion 43D erect from the peripheral edge (four sides) of the standing wall portion 41 toward the other side of the above-described stacking direction (the side on which the fixing member 20 is disposed). The side plate portions 43A, 43B, the lower plate portion 43C, and the upper plate portion 43D form a rectangular frame shape as a whole, and a single battery cell 10 is disposed thereinside.

The cutout portions 45A, 45B are provided in an edge portion of the upper plate portion 42D, and the cutout portions 45C, 45D are provided in the upper plate portion 43D. Respective positions of the cutout portions 45A, 45B, 45C, 45D correspond to the respective positions of the positive electrode terminal 14 and the negative electrode terminal 15 of each battery cell 10 disposed in the inside of the fixing member 40. The positive electrode terminal 14 and the negative electrode terminal 15 of each battery cell 10 are exposed respectively from the cutout portions 45A, 45B (see FIG. 1).

The erect walls 46A, 46B are disposed on the upper plate portion 42D (see FIG. 4). The erect wall 46A is adjacent to the cutout portion 45A on the inner side (a side where the gas-ventilation-passage defining portion 47 is located) of the cutout portion 45A, and the erect wall 46B is adjacent to the cutout portion 45B on the inner side (a side where the gas-ventilation-passage defining portion 47 is located) of the cutout portion 45B. The erect walls 46A, 46B function as insulation walls to secure electric insulation between the positive electrode terminal 14 and the negative electrode terminal 15, for example. The erect walls 46A, 46B may support the cover 60 from the lower side of the cover 60.

The gas-ventilation-passage defining portion 47 is provided on the upper plate portion 42D, 43D and at a position between the erect walls 46A, 46B. The gas-ventilation-passage defining portion 47 has an inner surface 47S and an outer surface 47T. The inner surface 47S of the gas-ventilation-passage defining portion 47 has a portion exhibiting a generally up-side-down U-shape. The portion faces the relief valve 13 provided in each of the plurality of the battery cells 10. A gas ventilation passage (the gas ventilation passage S illustrated in FIG. 3, FIG. 4) is provided on the inner surface 47S side of the gas-ventilation-passage defining portion 47, and the gas exhausted from the relief valve 13 of the battery cell 10 passes through the inside of the gas ventilation passage S provided in the inner side of the inner surface 47S.

Next, the gas-ventilation-passage defining portions 27, 37, 47 will be described. In the first embodiment, the gas-ventilation-passage defining portion 27 is integrally provided with the fixing member 20, the gas-ventilation-passage defining portion 37 is integrally provided with the fixing member 30, and the gas-ventilation-passage defining portion 47 is integrally provided with the fixing member 40.

The configurations of the gas-ventilation-passage defining portions are not limited to the above configuration, and the gas-ventilation-passage defining portion 27 may be provided separately from the fixing member 20 (the standing wall portion 21 or the like), and may be joined to the standing wall portion 21 or the like. The gas-ventilation-passage defining portion 37 may be provided separately from the fixing member 30 (the standing wall portion 31 or the like), and may be joined to the standing wall portion 31 or the like. The gas-ventilation-passage defining portion 47 may be provided separately from the fixing member 40 (the standing wall portion 41 or the like), and may be joined to the standing wall portion 41 or the like.

In the first embodiment, there are stacked the plurality of the battery cells 10 along with the fixing member 20, the fixing member 30, and the plurality of the fixing members 40. The gas-ventilation-passage defining portion 27, the gas-ventilation-passage defining portion 37, and the plurality of the gas-ventilation-passage defining portions 47 are continuously connected so as to compose the continuous gas ventilation passage S for exhausting the gas. Of the gas ventilation passage S, a part thereof located on the gas-ventilation-passage defining portion 37 side is sealed, and a part thereof on the gas-ventilation-passage defining portion 27 side communicates with the piping member 56 via the through-hole 54 (FIG. 1, FIG. 3).

Next, a temperature sensor 70 will be described. The temperature sensor 70 is disposed on the outer surface 27T side of the gas-ventilation-passage defining portion 27. In the first embodiment, the temperature sensor 70 is so disposed to be in contact with the outer surface 27T of the gas-ventilation-passage defining portion 27. As already described at the beginning, the gas exhausted from the relief valves 13 of the battery cells 10 has a temperature of 200° C. to 300° C., or more than the temperature, for example.

With reference to FIG. 6, when the gas passes through the inside of the gas ventilation passage S, heat of the gas increases the temperature of the gas-ventilation-passage defining portion 27. The temperature sensor 70 can indirectly measure the temperature of the inside of the gas ventilation passage S through the gas-ventilation-passage defining portion 27. Therefore, also in the battery pack 101 where the temperature sensor 70 is disposed on the outer surface 27T side of the gas-ventilation-passage defining portion 27, by measuring the temperature of the inside of the gas ventilation passage S by the temperature sensor 70, it is possible to detect that the gas is exhausted from the relief valve 13 of the battery cell 10.

Different from the battery pack of the related art, the battery pack 101 can reduce the dimension of the gas ventilation passage S. In other words, the battery pack 101 can employ the gas ventilation passage S having a smaller flow-passage sectional area. According to the battery pack 101, it is possible to promote an overall size reduction, and by utilizing a space spared by the reduced dimension of the gas ventilation passage S for other components, it is possible to enhance the performance of the battery pack.

In the configuration shown in FIG. 4, the temperature sensor 70 is disposed to be in contact with the outer surface 27T of a side wall portion 27C of the gas-ventilation-passage defining portion 27 (for convenience of explanation, the arrangement configuration of the temperature sensor 70 is defined as an arrangement configuration 1). The temperature sensor 70 is so disposed to be in direct contact with a part of the gas-ventilation-passage defining portion 27, the part in which the gas ventilation passage S is partitioned; thus, it is possible to measure the temperature of the inside of the gas ventilation passage S with a high responsiveness. As shown in FIG. 1, FIG. 3, the temperature sensor 70 may be disposed to be in contact with the top plate portion 27B of the gas-ventilation-passage defining portion 27. Also with the configuration, the temperature sensor 70 is disposed to be in direct contact with the part of the gas-ventilation-passage defining portion 27, the part in which the gas ventilation passage S is partitioned; thus, it is possible to measure the temperature of the inside of the gas ventilation passage S with a high responsiveness.

With reference to FIG. 6, in the present first embodiment, a plurality of the relief valves 13 include a relief valve 13 (a most downstream relief valve 13B) located most downstream of the flowing direction of the gas flowing through the inside of the continuous gas ventilation passage S. The plurality of the gas-ventilation-passage defining portions 27, 37, 47 include a downstream part (in this case, the gas-ventilation-passage defining portion 27 corresponds to the downstream part) provided with the gas ventilation passage S through which the gas exhausted from the most downstream relief valve passes. In other words, the gas exhausted from the relief valve 13 (the most downstream relief valve 13B) does not pass through the gas ventilation passage S composed by the gas-ventilation-passage defining portions 47 of the fixing members 40.

No matter from which relief valve 13 of the plurality of the battery cells 10 the gas is exhausted, the gas passes through the gas ventilation passage S provided in the inner side of the inner surface 27S of the downstream part (the gas-ventilation-passage defining portion 27); therefore, the gas-ventilation-passage defining portion 27 is inevitably heated during the exhaustion of the gas. The temperature sensor 70 measures the temperature of the inside of the gas ventilation passage S via the downstream part (the gas-ventilation-passage defining portion 27). No matter from which relief valve 13 of the plurality of the battery cells 10 the gas is exhausted, by measuring the temperature of the gas-ventilation-passage defining portion 27 by the temperature sensor 70, it is possible to detect the fact of the gas exhaustion.

Next, a cooling-passage defining member will be described. In the first embodiment, the cooling-passage defining member is composed by the cover 60, an upper part of the side wall 52A of the casing 50, an upper part of the side wall 52B of the casing 50, and an upper part of the end wall 52D of the casing 50. The cooling-passage defining member composed by the components is disposed on the respective outer surfaces 27T, 37T, 47T sides of the plurality of the gas-ventilation-passage defining portions (the gas-ventilation-passage defining portion 27, the gas-ventilation-passage defining portion 37, and the plurality of the gas-ventilation-passage defining portions 47), and a cooling passage Q is provided between the respective outer surfaces 27T, 37T, 47T of the plurality of the gas-ventilation-passage defining portions and the cooling-passage defining member.

The cooling fluid (such as air) introduced through the piping member 57 (FIG. 3) and the through-holes 55A, 55B (FIG. 1) into the casing 50 passes through the cooling passage Q, and further passes through not-illustrated ventilation routes provided in the respective standing wall portions 21, 31, 41 to reach a part below the standing wall portions 21, 31, 41 (see FIG. 5). When the fluid passes through the ventilation routes, the plurality of the battery cells 10 are cooled by the fluid. Thereafter, the fluid is exhausted through the exhaust port 52H to the outside of the casing 50 (FIG. 5).

The temperature sensor 70 may be configured to measure the temperature of the fluid inside the cooling passage Q. The fluid supplied into the cooling passage Q is 20° C. to 30° C., for example. Depending on the temperature of the fluid supplied into the cooling passage Q, the vehicle ECU or the like may be configured to appropriately control charge-discharge of the battery pack 101. When the temperature measured by the temperature sensor 70 is a predetermined threshold value or less, such as 50° C. or less, or 100° C. or less, the vehicle ECU can determine that no gas is exhausted from the relief valves 13 of the battery cells 10. On the other hand, when the temperature measured by the temperature sensor 70 is more than a predetermined threshold value, such as 200° C. or more, the vehicle ECU can determine that the gas is exhausted from the relief valves 13 of the battery cells 10.

In the present first embodiment, the plurality of the battery cells 10 include a most upstream battery cell (in this case, the battery cell 10B) located at a most upstream position in the flowing direction of the fluid flowing through the cooling passage Q. The temperature sensor 70 is preferably disposed at a position more upstream than the most upstream battery cell (the battery cell 10B) in the cooling passage Q (for convenience of explanation, the arrangement configuration of the temperature sensor 70 is defined as an arrangement configuration 2). According to the configuration, the temperature sensor 70 can measure the temperature of the cooling fluid that has not yet been used for cooling any of the battery cells 10 with high accuracy. In the present first embodiment, the through-hole 54 from which the gas flowing from the relief valves 13 is exhausted, and the through-holes 55A, 55B into which the cooling fluid is introduced are all provided in the end wall 52C of the casing 50; therefore, it is possible to realize the above arrangement configurations 1, 2 of the temperature sensor 70 by the single temperature sensor 70.

With reference to FIG. 5, in the present first embodiment, the inclined surfaces 53A, 53B are provided on the bottom 51 of the casing 50 in such a manner as to project from the bottom 51. Each of the inclined surfaces 53A, 53B has an outer surface shape such that a part thereof on the end wall 52C side is lower and a part thereof on the end wall 52D side is higher. With the configuration, the cooling passage Q is configured to have a flow-passage sectional area gradually smaller from an upstream side toward a downstream side in the direction in which the fluid flows through the inside of the cooling passage Q.

If the cooling passage Q has a sufficiently large flow-passage sectional area, almost no pressure gradient is generated in the cooling passage Q. For example, if it is attempted to reduce the thickness of the battery pack 101, the flow-passage sectional area of the cooling passage Q becomes smaller, so that the pressure gradient is likely to be generated in the cooling passage Q. If a high pressure gradient is present in the cooling passage Q, variation in cooling efficiency of the cooling fluid is more likely to be generated among the plurality of the battery cells 10. To the contrary, by configuring the cooling passage Q to have a flow-passage sectional area gradually smaller from an upstream side toward a downstream side in the direction in which the fluid flows through the inside of the cooling passage Q, the above-described pressure gradient becomes more unlikely to be generated.

Figure 7:
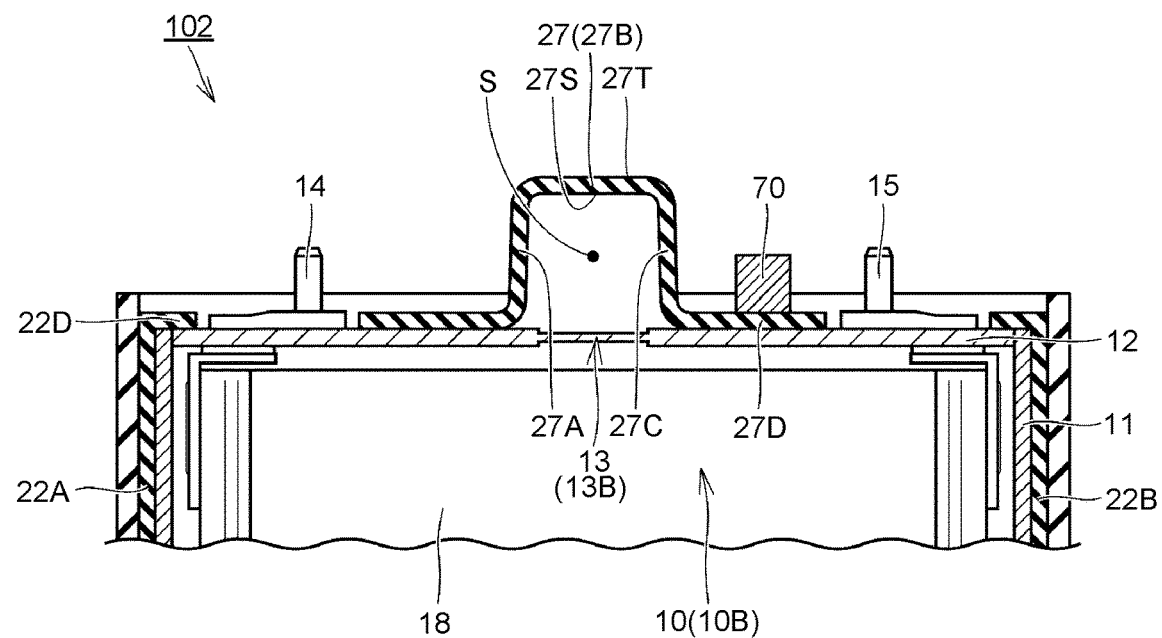
FIG. 7 is a sectional view showing a battery pack 102 according to a second embodiment of the present disclosure.

Next, the second embodiment of the present disclosure will be described. FIG. 7 is a sectional view showing a battery pack 102 in the second embodiment. FIG. 7 corresponds to FIG. 4 in the first embodiment. The first embodiment and the second embodiment are different from each other in the following points. In the first embodiment (FIG. 4), the temperature sensor 70 is disposed to be in contact with the outer surface 27T of the side wall portion 27C of the gas-ventilation-passage defining portion 27, and the temperature sensor 70 is so disposed to be in direct contact with a part (the side wall portion 27C) of the gas-ventilation-passage defining portion 27, the part in which the gas ventilation passage S is partitioned.

As shown in FIG. 7, in the present second embodiment, the temperature sensor 70 is disposed to be in contact with the outer surface 27T of the gas-ventilation-passage defining portion 27, and the temperature sensor 70 is out of contact with the part of the gas-ventilation-passage defining portion 27, the part in which the gas ventilation passage S is partitioned, but is disposed to be in direct contact with a part 27D of the gas-ventilation-passage defining portion 27, the part 27D being apart from the side wall portion 27C.

When the gas passes through the inside of the gas ventilation passage S, heat of the gas increases the temperature of the gas-ventilation-passage defining portion 27. Therefore, even if the temperature sensor 70 is disposed to be in direct contact with the part 27D apart from the side wall portion 27C, the temperature sensor 70 can indirectly measure the temperature of the inside of the gas ventilation passage S via the gas-ventilation-passage defining portion 27 (the part 27D). Accordingly, also in the battery pack 102 in which the temperature sensor 70 is disposed on the outer surface 27T side of the gas-ventilation-passage defining portion 27, by measuring the temperature of the inside of the gas ventilation passage S by the temperature sensor 70, it is possible to detect that the gas is exhausted from the relief valves 13 of the battery cells 10.

As the temperature sensor 70 shown in FIG. 7, the temperature sensor 70 is disposed to be adjacent to the surface of the battery cell 10 so as to measure the temperature of the battery cell 10. The temperature sensor 70 shown in FIG. 7 faces the cover 12 of the battery cell 10 via the part 27D. It may be configured that depending on the temperature of the battery cell 10 measured by the temperature sensor 70, the vehicle ECU or the like appropriately controls charge-discharge of the battery pack 102. If the temperature measured by the temperature sensor 70 is a predetermined threshold value or less, such as 50° C. or less and 100° C. or less, the vehicle ECU can determine that no gas is exhausted from the relief valves 13 of the battery cells 10. On the other hand, if the temperature measured by the temperature sensor 70 is more than the predetermined threshold value, such as 200° C. or more, the vehicle ECU can determine that the gas is exhausted from the relief valves 13 of the battery cells 10.

Figure 8:
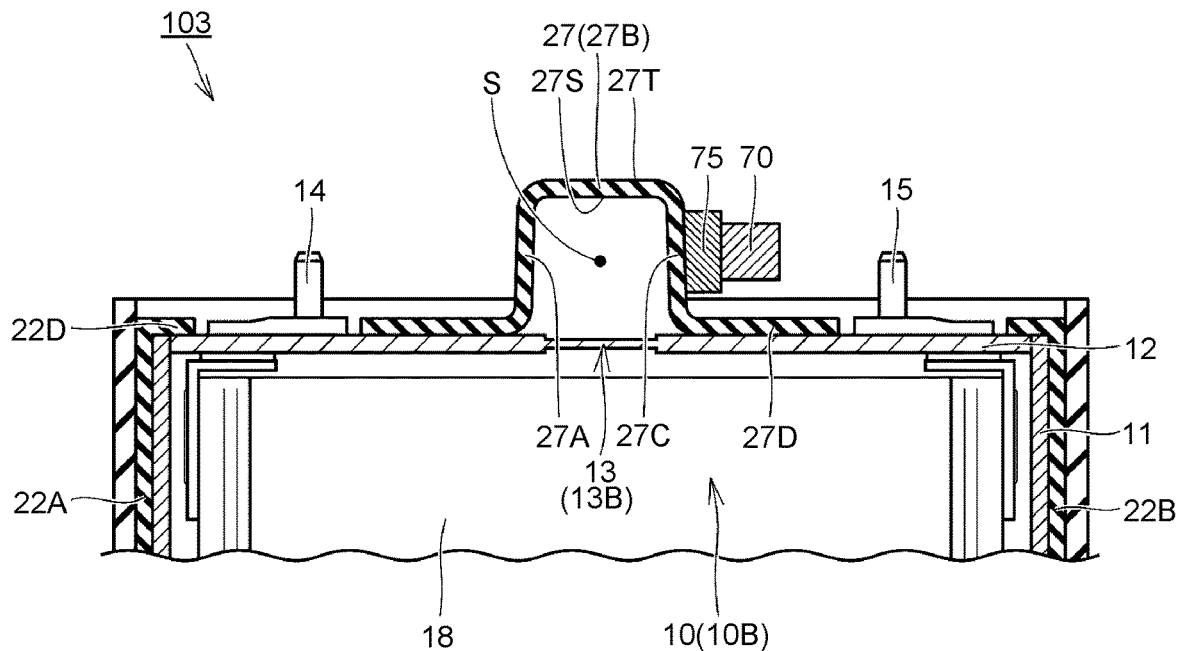
FIG. 8 is a sectional view showing a battery pack 103 according to a third embodiment of the present disclosure.

Next, the third embodiment of the present disclosure will be described. FIG. 8 is a sectional view showing a battery pack 103 in the third embodiment. FIG. 8 corresponds to FIG. 4 in the first embodiment. The first embodiment and the third embodiment are different from each other in the following points. In the third embodiment (FIG. 8), the battery pack 103 further includes a heat transfer member 75 in contact with the outer surface 27T of the gas-ventilation-passage defining portion 27, and the temperature sensor 70 is disposed to be in contact with the heat transfer member 75 so as to measure the temperature of the inside of the gas ventilation passage S via the heat transfer member 75 and the gas-ventilation-passage defining portion 27.

Also in the battery pack 103 in which the temperature sensor 70 is disposed on the outer surface 27T side of the gas-ventilation-passage defining portion 27, by measuring the temperature of the inside of the gas ventilation passage S by the temperature sensor 70, it is possible to detect that the gas is exhausted from the relief valves 13 of the battery cells 10. According to the configuration, the feature that the temperature sensor 70 can be disposed at a position apart from the gas-ventilation-passage defining portion promotes enhancement of flexibility in light of the installation of the temperature sensor 70.

Figure 9:
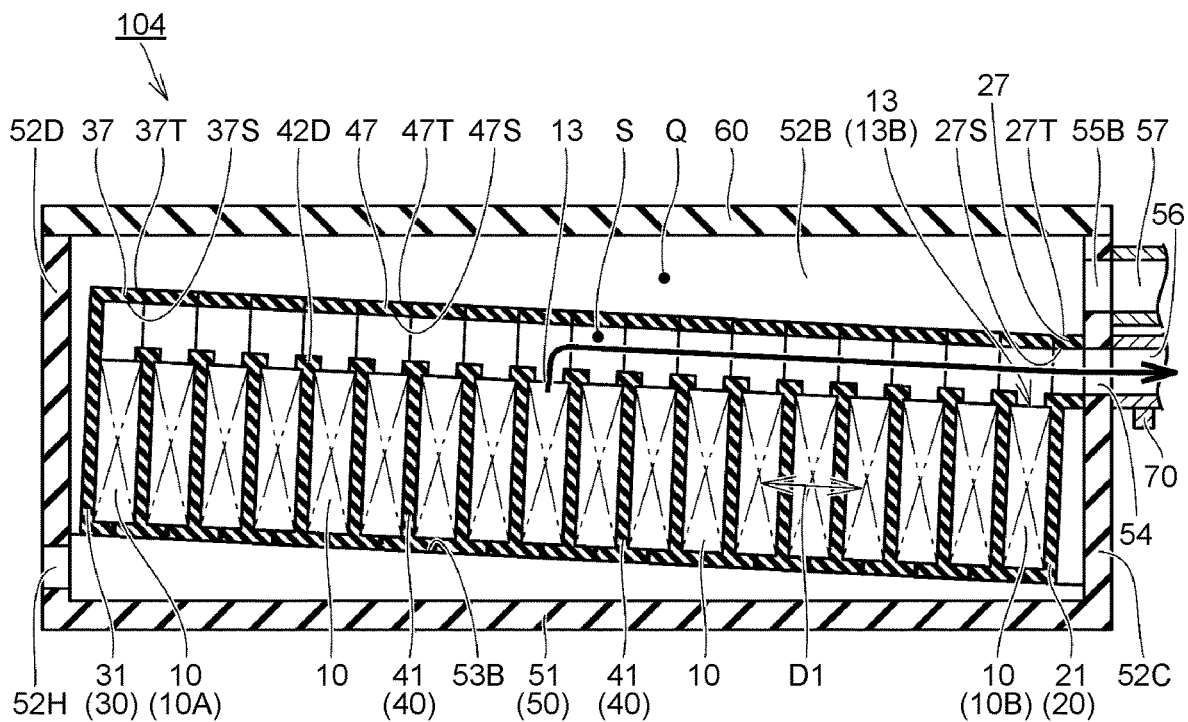
FIG. 9 is a sectional view showing a battery pack 104 according to a fourth embodiment of the present disclosure.

Next, the fourth embodiment of the present disclosure will be described. FIG. 9 is a sectional view showing a battery pack 104 according to the fourth embodiment. FIG. 9 corresponds to the FIG. 6 in the first embodiment. The first embodiment and the fourth embodiment are different from each other in the following point. In the present fourth embodiment (FIG. 9), the temperature sensor 70 is disposed to be in contact with an outer surface of the piping member 56.

In the present fourth embodiment, the piping member 56 functions as a "gas-ventilation-passage defining portion", and has an inner surface and the outer surface, and the gas ventilation passage S is provided in the inner side of the inner surface of the piping member 56, and the gas exhausted from the relief valve 13 passes through the inside of the gas ventilation passage S. The temperature sensor 70 is disposed on the outer surface side of the piping member 56 (the gas-ventilation-passage defining portion) so as to measure the temperature of the inside of the gas ventilation passage S via the piping member 56.

When the gas passes through the inside of the gas ventilation passage S, heat of the gas increases the temperature of the piping member 56 (the gas-ventilation-passage defining portion). Accordingly, even if the temperature sensor 70 is disposed outside the casing 50, for example, the temperature sensor 70 can indirectly measure the temperature of the inside of the gas ventilation passage S via the piping member 56 (the gas-ventilation-passage defining portion). Also in the battery pack 104 in which the temperature sensor 70 is disposed on the outer surface side of the piping member 56 (the gas-ventilation-passage defining portion), by measuring the temperature of the inside of the gas ventilation passage S by the temperature sensor 70, it is possible to detect that the gas is exhausted from the relief valve 13 of the battery cell 10.

Figure 10:
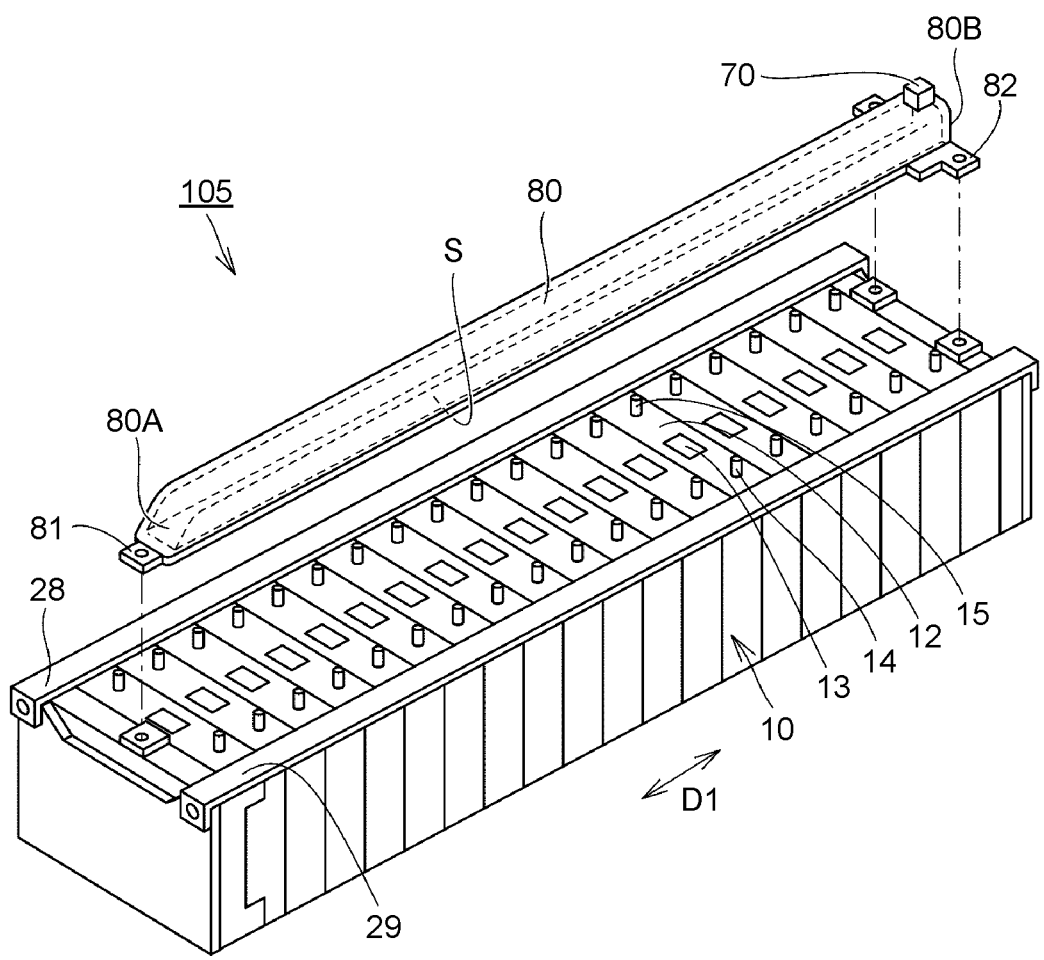
FIG. 10 is a sectional view showing a battery pack 105 according to a fifth embodiment of the present disclosure.

Next, the fifth embodiment will be described. FIG. 10 is a perspective view showing a battery pack 105 according to the fifth embodiment. The first embodiment and the fifth embodiment are different from each other in the following point. In the above-described first embodiment, the gas-ventilation-passage defining portions 27, 37, 47 are integrally provided in the fixing members 20, 30, 40, respectively.

As shown in FIG. 10, in the present fifth embodiment (FIG. 10), instead of the gas-ventilation-passage defining portions 27, 37, 47, a gas-ventilation-passage defining portion 80 is used. The gas-ventilation-passage defining portion 80 has a shape extending along the direction where the plurality of the relief valves 13 are arranged, and one end 80A of the gas-ventilation-passage defining portion 80 is sealed, and the other end 80B thereof is opened. The plurality of the battery cells 10 are stacked along the arrow D1 direction, and are integrated with fastening tools 28, 29. The gas-ventilation-passage defining portion 80 is fixed to the plurality of the battery cells 10 using fixing portions 81, 82.

Also in the present fifth embodiment, the gas-ventilation-passage defining portion 80 has an inner surface and an outer surface, the gas ventilation passage S is provided in the inner surface side, and the gas exhausted from the relief valve 13 passes through the inside of the gas ventilation passage S. The temperature sensor 70 is disposed on the outer surface side of the gas-ventilation-passage defining portion 80 so as to measure the temperature of the inside of the gas ventilation passage S via the gas-ventilation-passage defining portion 80.

When the gas passes through the inside of the gas ventilation passage S, heat of the gas increases the temperature of the gas-ventilation-passage defining portion 80. Also in the case in which the temperature sensor 70 is disposed outside the gas-ventilation-passage defining portion 80, the temperature sensor 70 can indirectly measure the temperature of the inside of the gas ventilation passage S via the gas-ventilation-passage defining portion 80. Accordingly, also in the battery pack 105, by measuring the temperature of the inside of the gas ventilation passage S by the temperature sensor 70, it is possible to detect that the gas is exhausted from the relief valve 13 of the battery cell 10.

As described above, the embodiments have been explained, and it should be considered that the embodiments disclosed herein are merely examples in all respects, but are not restrictive. The technical scope of the present disclosure is defined by the claims, and it is intended to include all modifications within the scope of the claims and the equivalents thereof.

What is claimed is:

1. A battery pack installed in a vehicle, the battery pack comprising:
   a plurality of battery cells, each of the battery cells including a relief valve and being configured to exhaust gas through the relief valve;
   a gas-ventilation-passage wall including an inner surface and an outer surface, wherein the inner surface faces a gas ventilation passage and the outer surface is an opposite surface of the inner surface of the gas-ventilation-passage wall, and wherein the gas-ventilation-passage wall is configured to allow the gas exhausted from the relief valves to pass through the gas ventilation passage; and
   a temperature sensor disposed in contact with the outer surface of the gas-ventilation-passage wall, and configured to measure a temperature of an inside of the gas ventilation passage via the gas-ventilation-passage wall.

2. A battery pack installed in a vehicle, the battery pack comprising:
   a plurality of battery cells, each of the battery cells including a relief valve and being configured to exhaust gas through the relief valve;
   a gas-ventilation passage wall including an inner surface and an outer surface, wherein the inner surface faces a gas ventilation passage and the outer surface is an opposite surface of the inner surface of the gas-ventilation-passage wall, and wherein the gas-ventilation-passage wall is configured to allow the gas exhausted from the relief valves to pass through the gas ventilation passage;
   a heat transfer member in contact with the outer surface of the gas-ventilation-passage wall; and
   a temperature sensor disposed in contact with the heat transfer member, wherein the temperature sensor is configured to measure the temperature of the inside of the gas ventilation passage via the heat transfer member and the gas-ventilation-passage wall.

3. The battery pack according to claim 1, further comprising a plurality of fixing members fixed to the battery cells,
   wherein the gas-ventilation-passage wall is integrally provided in the fixing members.

4. The battery pack according to claim 3, wherein:
   each of the fixing members is fixed to a corresponding one of the battery cells, and
   the battery cells along with the fixing members are stacked such that a plurality of the gas-ventilation-passage walls are connected to each other to provide a continuous gas ventilation passage through which the gas is exhausted.

5. The battery pack according to claim 4, wherein:
   a plurality of the relief valves include a most downstream relief valve located most downstream in a direction in which the gas flows through the inside of the continuous gas ventilation passage,
   the plurality of the gas-ventilation-passage walls include a downstream part provided with the gas ventilation passage through which the gas exhausted from the most downstream relief valve passes, and
   the temperature sensor is configured to measure the temperature of the inside of the gas ventilation passage via the downstream part.

6. The battery pack according to claim 4, further comprising a cooling-passage defining member provided on a side of the outer surface of the gas-ventilation-passage wall,
   wherein a cooling passage is provided between the respective outer surfaces of the plurality of the gas-ventilation-passage wall and the cooling-passage defining member,
   wherein a fluid flowing through the cooling passage is supplied to cool the plurality of the battery cells, and
   wherein the temperature sensor is configured to measure a temperature of the fluid in the cooling passage.

7. The battery pack according to claim 6, wherein:
   the plurality of the battery cells include a most upstream battery cell located most upstream in a direction in which the fluid flows through the inside of the cooling passage, and
   the temperature sensor is disposed at a position in the cooling passage and upstream of the most upstream battery cell in the direction in which the fluid flows through the inside of the cooling passage.

8. The battery pack according to claim 6, wherein the cooling passage is configured to have a flow-passage sectional area that gradually decreases from an upstream side toward a downstream side in the direction in which the fluid flows through an inside of the cooling passage.

9. A battery pack installed in a vehicle, the battery pack comprising:
   a plurality of battery cells, each of the battery cells including a relief valve and being configured to exhaust gas through the relief valve;
   a gas-ventilation-passage wall, including an inner surface and an outer surface, wherein the inner surface faces a gas ventilation passage and the outer surface is an opposite surface of the inner surface of the gas-ventilation-passage wall, and wherein the gas-ventilation-passage wall is configured to allow the gas exhausted from the relief valves to pass through the gas ventilation passage;
   a pipe disposed downstream from the gas-ventilation passage, which receives the gas flowing out from the gas-ventilation-passage; and a temperature sensor disposed in contact with an exterior surface of the pipe, and
configured to measure a temperature of an inside of the gas ventilation passage via the pipe.

10. The battery pack according to claim 9, further comprising a plurality of fixing members fixed to the battery cells,
wherein the gas-ventilation-passage defining portions are integrally provided in the fixing members.

11. The battery pack according to claim 10, wherein:
each of the fixing members is fixed to a corresponding one of the battery cells, and
the battery cells along with the fixing members are stacked such that a plurality of the gas-ventilation-passage defining portions are connected to each other to provide a continuous gas ventilation passage through which the gas is exhausted.

12. The battery pack according to claim 11, wherein:
a plurality of the relief valves include a most downstream relief valve located most downstream in a direction in which the gas flows through the inside of the continuous gas ventilation passage,
the plurality of the gas-ventilation-passage defining portions include a downstream part provided with the gas ventilation passage through which the gas exhausted from the most downstream relief valve passes, and
the temperature sensor is configured to measure the temperature of the inside of the gas ventilation passage via the downstream part.

13. The battery pack according to claim 11, further comprising a cooling-passage defining member provided on a side of the outer surface of the gas-ventilation-passage defining portions,
wherein a cooling passage is provided between the respective outer surfaces of the plurality of the gas-ventilation-passage defining portions and the cooling-passage defining member,
wherein a fluid flowing through the cooling passage is supplied to cool the plurality of the battery cells, and
wherein the temperature sensor is configured to measure a temperature of the fluid in the cooling passage.

14. The battery pack according to claim 13, wherein:
the plurality of the battery cells include a most upstream battery cell located most upstream in a direction in which the fluid flows through the inside of the cooling passage, and
the temperature sensor is disposed at a position in the cooling passage and upstream of the most upstream battery cell in the direction in which the fluid flows through the inside of the cooling passage.

15. The battery pack according to claim 13, wherein the cooling passage is configured to have a flow-passage sectional area that gradually decreases from an upstream side toward a downstream side in the direction in which the fluid flows through an inside of the cooling passage.

* * * * *